Dec. 17, 1963    B. B. JACOBSON    3,114,428
VEHICLE SPEED CONTROL DEVICE

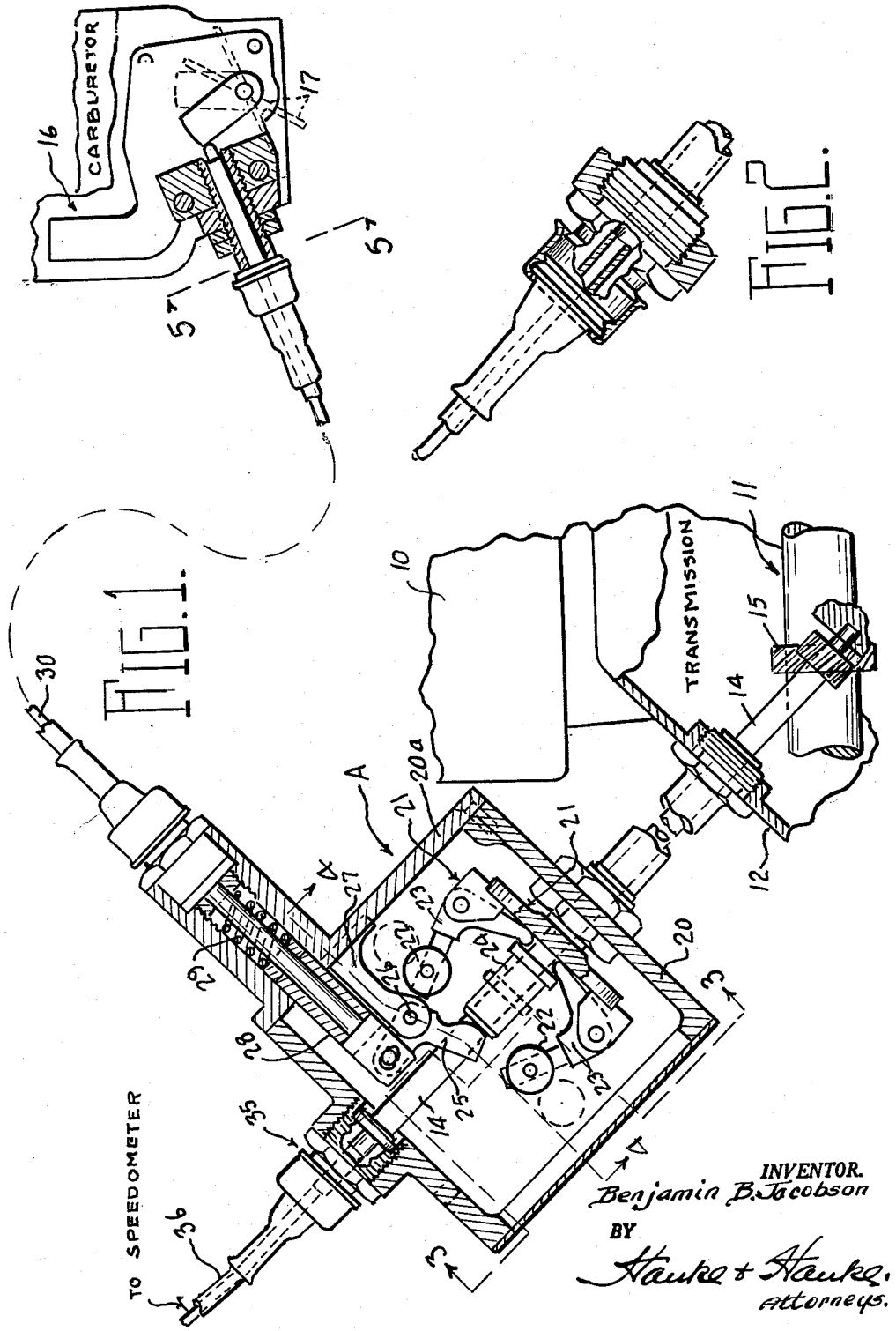

Filed March 6, 1961    2 Sheets-Sheet 2

INVENTOR.
Benjamin B. Jacobson
BY
Hauke & Hauke
Attorneys.

United States Patent Office 3,114,428
Patented Dec. 17, 1963

3,114,428
VEHICLE SPEED CONTROL DEVICE
Benjamin B. Jacobson, Southfield, Mich., assignor to
J. & L. Devices, Inc., East Detroit, Mich., a corporation of Michigan
Filed Mar. 6, 1961, Ser. No. 93,760
2 Claims. (Cl. 180—82.1)

My invention relates to a vehicle speed control device or means for automobiles, trucks and the like, and more particularly to a governor construction responsive in its operation to vehicle speed as compared to most types in general use which are responsive to engine speed or load.

It is an object of my present invention to govern vehicle speed no matter what the engine loading may be, and thus prevent the vehicle operator from speeding down grade as well as in level terrain or on upgrades, whereby to avoid excessive wear on the principal vehicle moving parts, as it is well known that excessive speed will generate excessive heat in vehicle moving parts such as wheel bearings and transmission and differential bearings, and thus a control responsive to vehicle speed will lengthen the vehicle life and result in minimum maintenance and servicing costs or other costly breakdowns. This is all important to fleet operators, where economical transportation expenses are critical in the successful operation of the transportation system.

It is further an object of my invention to improve economies of fleet transportation systems by providing a speed control assembly that can be readily adapted to and be conveniently and economically assembled on generally all types of trucks or the like without any major disassembly of the vehicle power plant or other accessory assemblies.

Further objects are to make such vehicle speed controls available to truck operators at low cost because of the simplified construction of the device and the use therewith of a minimum of moving parts.

For a more detailed understanding of my invention, reference may be had to the accompanying drawings illustrating preferred embodiments of my invention in which like parts are referred to by like characters or other identifying symbols throughout the several views, and in which:

FIG. 1 is a general assembly view partly in section, of a governor, a fuel and air mixture device such as a carburetor and the connections therebetween.

FIG. 2 is a detailed sectional view of the connection between the speedometer drive shaft and speedometer cable assembly.

Figure 3:
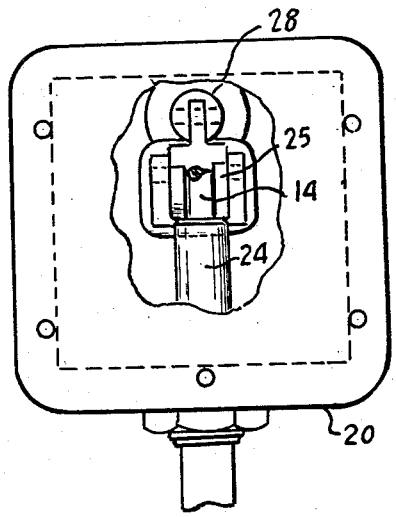
Figure 4:
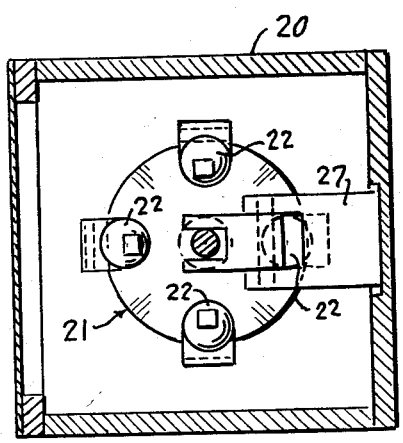

FIGS. 3 and 4 are detailed sectional views taken on the lines 3—3 and 4—4 respectively of FIG. 1, and showing the detailed structure of parts of the governor assembly.

Figure 5:
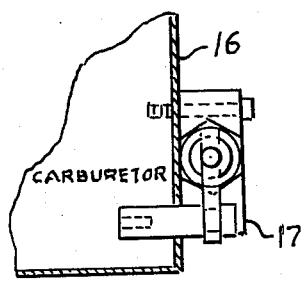

FIG. 5 is a detailed sectional view on the line 5—5 of FIG. 1.

The present vehicle speed control device is diagrammatically illustrated as mounted on an engine or vehicle power plant 10 having a conventional transmission 11 provided with a transmission casing 12 by which a speedometer driveshaft 14 is supported in any suitable manner and driven from a drive gear 15 of the transmission.

The engine is equipped with a conventional carburetor 16 having the conventional throttle valve 17 which is actuated in a conventional manner by the accelerator pedal (not shown), and is in this instance also hooked up to be also controlled by the vehicle speed control device, indicated as a whole by the reference character "A," in order that the operator of the automobile, truck or the like cannot operate the vehicle at speeds in excess of the speed selected as maximum safety speed.

The control device "A" comprises a housing 20 having bearings or other suitable supports 21 for the speedometer driveshaft 14, which in the present instance is extended into the housing 20 and drives a flyball governor 21, the weights 22 being moved outwardly under centrifugal forces generated by rotation of the governor and comprise bell cranks 23 which engage a sleeve 24 slidable on the shaft 14, which sleeve engages the bell crank 25 pivoted at 26 to bracket 27 carried by the housing cover 20a. The bell crank 25 is connected with a stub shaft 28 and on rotation of said crank 25 the shaft 28 is moved against the compression of spring 29 and is connected with a Bowden wire 30 in any suitable manner to move same and actuate the throttle valve 17.

When the vehicle speed reaches the highest allowable maximum, the force of the weight is sufficient to overcome the spring 29 and thus the throttle valve is moved towards a closed position, slowing the engine and tending to maintain vehicle speed within the prescribed limits.

The shaft 14 is connected at 35 to the standard speedometer cable 36.

It will be apparent to those skilled in the art to which my invention pertains that various changes may be made therein without departing from the spirit of the invention or from the scope of the appended claims.

I claim:
1. In a speed control for an automotive vehicle having an internal combustion engine with a carburetor having a lever-controlled throttle valve, and a speedometer having a drive shaft operably connected to the transmission of the vehicle,
    a centrifugal governor operably connected to the speedometer drive shaft,
    a throttle control member overriding the throttle lever control and including a housing enclosing said governor,
    the speedometer drive shaft being extended beyond the outer face of the transmission to provide a mounting for said housing,
    said shaft extension bridging said housing interior space and having speedometer cable attachment means at its extreme exposed end,
    and means connecting said governor to said carburetor throttle control member comprising a stub shaft slidably supported by said housing for movement in a direction normal to the axis of the speedometer drive shaft extension.

2. In a speed control for an automotive vehicle having an internal combustion engine with a carburetor having a lever-controlled throttle valve, and a speedometer having a drive shaft operably connected to the transmission of the vehicle,
    a governor operably connected to the speedometer drive shaft,
    a throttle control member overriding the throttle lever control and comprising a housing enclosing said governor, the speedometer drive shaft being extended beyond the outer face of the transmission to provide a mounting for said housing, said shaft bridging said housing interior space and having speedometer cable attachment means at its extreme exposed end, means connecting said governor to the carburetor throttle control member comprising a stub shaft slidably supported by said housing for movement in a direction normal to the axis of the speedometer drive shaft extension, an intermediate lever pivotally mounted within said housing and having one end operably connected to said stub shaft and the other end operably connected to said governor, and the other end of said intermediate lever being provided with an elongated slot through which said speedometer drive shaft extends.

References Cited in the file of this patent
UNITED STATES PATENTS

| | | |
|---|---|---|
| 1,112,137 | Henderson | Sept. 29, 1914 |
| 2,225,206 | Cassels | Dec. 17, 1940 |
| 2,251,186 | Deaver et al. | July 29, 1941 |